2,886,383
PISTON RING

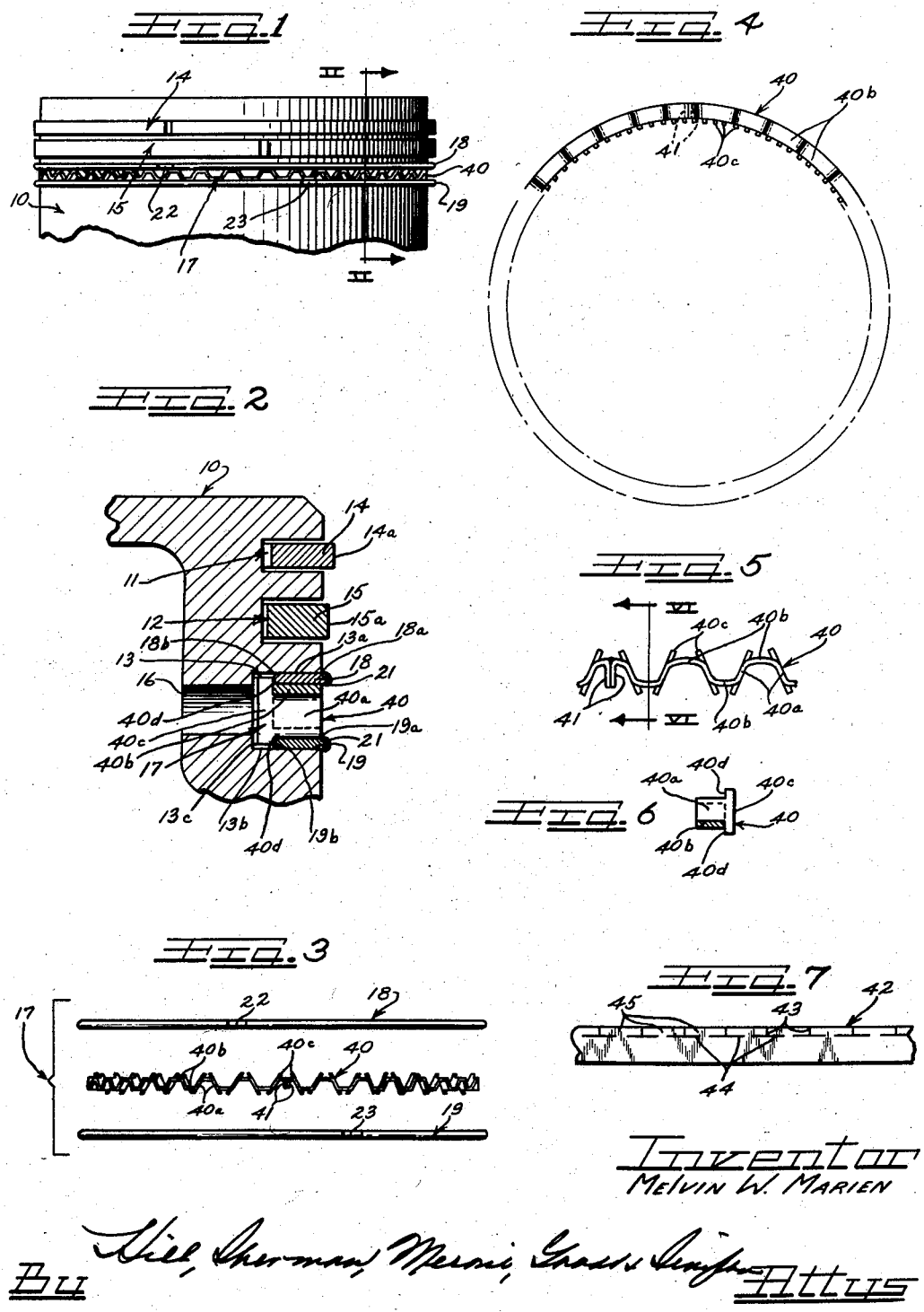

Melvin W. Marien, Brentwood, Mo., assignor to Ramsey Corporation, St. Louis, Mo., a corporation of Ohio Application May 2, 1956, Serial No. 582,229, now Patent No. 2,831,738, dated April 22, 1958, which is a division of application Serial No. 303,465, August 9, 1952, now Patent No. 2,744,803, dated May 8, 1956. Divided and this application March 14, 1958, Serial No. 721,443

4 Claims. (Cl. 309—45)

This invention relates to packing ring assemblies having cylinder wall engaging rings held in operative position by a combination expander and spacer ring. Specifically, this invention deals with an oil control piston ring assembly having top and bottom flat thin ring segments or rails and a self-expanding open-type ring between and behind the thin rings or rails to space and expand the thin rings or rails.

The present application is a division of my copending application Serial No. 582,229, filed May 2, 1956, now Patent No. 2,831,738, which, in turn, is a division of my U.S. Patent No. 2,744,803, granted May 8, 1956, from an application filed August 9, 1952.

This invention will hereinafter be specifically described as embodied in a piston ring assembly for pistons of internal combustion engines but it should be understood that the ring assemblies of this invention are generally useful as packing rings to control lubrication of relatively movable parts.

According to this invention, there is provided a stack of rings including top and bottom flat thin steel rail segments and an intermediate combination expander and spacer ring. This intermediate ring extends between and behind the steel rings or rails and is a radially compressible self-expanding flexible sheet metal ring adapted to exert equal expansion loads around the entire circumference of each of the thin rings or rails. These rail rings or segments are preferably provided with chromium-plated outer rounded peripheries to present hard wear-resisting edges to the cylinder wall. The expander and spacer ring is preferably formed of thin steel strip stock and is spring tempered. This combination expander and spacer ring is corrugated axially to provide segment or rail rings supporting top and bottom loops or crowns joined by sloping legs. Tab portions are formed on the inner peripheral ends of the legs and project beyond the top and bottom loops or crowns to provide abutment shoulders at the inner ends of the legs for engaging the inner peripheries of the segment or rail rings supported by the loops or crowns. When the combination spacer and expander ring is circumferentially compressed, as when assembled in a piston ring groove, the portions of the tabs projecting beyond the legs will engage the inner peripheries of the rails or segments supported by the loops or crowns to radially expand these rails or segments against the wall of the cylinder in which the piston reciprocates. The arrangement is such that the stack of rings does not bottom on the inner end of the piston ring groove, and the outer peripheries of the rails extend beyond the outer periphery of the corrugated ring. The assembly has open spaces therethrough adapted to communicate with oil vent holes in the piston for controlling drainage of oil between the thin ring segments or rails.

An important feature of this invention resides in the provision of a single ring having the dual capacity of supporting the ring segments or rails in spaced operative position while at the same time radially expanding these rings against the cylinder wall.

Another important feature of this invention is to provide an oil control piston ring assembly wherein separate ring segments are evenly loaded around their entire circumference by a separator ring.

It is then, an object of this invention to provide a packing ring having a plurality of thin flat sealing rings and a single circumferential expander spacer ring holding the thin rings in spaced relation while urging the rings radially outward around their entire periphery.

A further object of the invention is to provide a piston ring assembly especially adapted for the oil ring groove of pistons wherein a single spring ring acts as an expander and a spacer.

A still further object of the invention is to provide an oil control ring for internal combustion engine pistons wherein a one-piece radially expansible ring supports a plurality of sealing rings in spaced operative relation.

A further object of this invention is to provide an oil control ring for the oil grooves of internal combustion engine pistons which has a pair of spaced-opposed thin flat steel segment rings with outer peripheral edges having a hard wearable chromium plating thereon and with a spring metal corrugated ring extending between and behind the thin rings to support the same against the top and bottom side walls of the ring groove to seat their hard outer edges on a cylinder wall receiving the piston.

A specific object of this invention is to provide an axially corrugated combination spacer and expander piston ring having top and bottom rail ring supporting loops or crowns connected by inclined legs and having tabs on the inner peripheral ends of the legs projecting beyond the tops and bottoms of the loops or crowns to provide abutment shoulders for expanding rail or segment rings supported on the loops or crowns.

Still another specific object of this invention is to provide a combined spacer and expander piston ring formed from strip metal stock slit inwardly at intervals from one edge to provide cuts for forming the terminal ends of tabs and also slit parallel to this edge to provide cuts intersecting the slits and then corrugated to provide axially inclined legs and top and bottom rail rings supporting loops with the tabs remaining flat and extending beyond the loops at the inner periphery of the ring.

Other and further objects of this invention will become apparent to those skilled in the art from the following detailed description of the annexed sheet of drawings which, by way of a preferred example, illustrates an embodiment of this invention.

On the drawing:

Fig. 1 is a side elevational view of a piston equipped with an oil ring assembly of this invention.

Fig. 2 is an enlarged fragmentary vertical cross-sectional view taken along line II—II of Fig. 1.

Fig. 3 is an exploded elevational view of the oil groove piston ring assembly shown in Figs. 1 and 2.

Fig. 4 is a plan view of the expander and spacer ring for the oil control piston ring assembly.

Fig. 5 is an enlarged fragmentary side elevational view of the ring of Fig. 4.

Fig. 6 is a cross-sectional view of the ring of Fig. 5 taken along the line VI—VI of Fig. 5.

Fig. 7 is a fragmentary plan view of a blank from which the ring of Figs. 4 to 6 is formed.

As shown on the drawing:

In Figs. 1 and 2 the reference numeral 10 designates generally a piston for an internal combustion engine. The piston 10 is equipped with the conventional top ring groove 11, middle ring groove 12, and oil ring groove 13. A conventional split solid cast iron piston ring 14 is mounted in the top groove 11 to provide a compression seal. A conventional split compression ring 15 also of cast iron composition is seated in the middle groove 12. The rings 14 and 15 have broad cylinder wall engaging faces 14a and 15a respectively.

The oil ring groove 13 is wider than the grooves 11 and 12 and is joined through oil holes such as 16 with the interior of the piston. This groove 13 has a top wall 13a and a bottom wall 13b extending radially outward from a vertical back wall 13c which is pierced at intervals by the oil holes 16.

An oil control ring assembly 17 of this invention is mounted in the oil groove 13. This assembly 17 includes a top thin flat ring segment 18, an identical bottom segment 19, and an intermediate combination expander and spacer ring 40. The rings 18 and 19 have rounded outer peripheral edges 18a and 19a each covered with a layer of chromium or other hard corrosion and wear-resisting metal 21 so that the cylinder wall engaging edges of each ring are reinforced with a hard coating. The coating can be applied by electro-plating, brazing, or in any other suitable manner. The inner peripheral edges of the rings 18 and 19 are also rounded at 18b and 19b, respectively, but the inner peripheries are not coated with the hard metal. As shown in Fig. 3, the ring segments or rails 18 and 19 are split and gaps 22 and 23 are respectively provided between the ends of the ring. These gaps will vary in width as shown, even when the rings are in operation on the piston 10 as shown in Fig. 1 to permit radial contraction and expansion of the thin rings.

The ring 40, on the other hand, has abutted together ends 41 as shown in Figs. 3 and 4, providing a closed ring, which, when radially compressed, will contract with a resilient spring-like action to exert an equal outer radial load around its entire periphery.

The ring 40 is provided with corrugations extending in a vertical plane and having the abutting ends 41 providing a closed ring. The corrugations or convolutions, as best shown in Figs. 3 and 5, include legs 40a sloping in a vertical plane and connected at their top and bottom ends by loops or crowns 40b. The legs 40a and the loops 40b extend radially of the ring groove from tab portions 40c, formed on the inner peripheral ends of the legs 40a and projecting beyond the top and bottom of the loops 40b to provide shoulders 40d at the inner ends of the legs, which shoulders project above and below the loops. These shoulders 40d form abutments for the inner edges of the ring segments 18 and 19, as shown in Fig. 2, while the legs 40a extend between the rings 18 and 19 to form separators with the rings resting on the loops 40b.

As shown in Fig. 7, the ring 40 is formed from flat strip stock 42 which is slit inwardly from one edge at intervals to provide cuts 43 forming the terminal ends for the tabs 40c. The strip is also slit parallel to an edge to provide cuts 44 which intersect the cuts 43 and, therefore, separate the outer ends of the tabs from the loops. The strip is then corrugated to provide the legs 40a and the connecting loops 40b while the tab blank portions 45 remain flat.

Therefore, vertical corrugations are provided in the ring 40 to form top and bottom rail ring supporting loops or crowns and inclined legs, while abutment shoulders are formed from the tabs on the inner periphery of the ring.

Thus, the ring 40 exerts its expanding load simultaneously on both thin rings 18 and 19, and at the same time, separates these rings to hold them against the top and bottom faces of the ring groove.

The corrugations or legs 40a are separated around the periphery of the ring 40 so that the space between the rings 18 and 19 is in open communication with oil drain holes such as 16 communicating with the back wall 13c of the ring groove.

The ring groove 13 can be of any desired depth since the ring 40 need not be bottomed on the groove in order to exert its expanding force. Thus, as shown in Fig. 2, the inner periphery of the ring 40 is actually spaced radially outward from the back wall 13c of the ring groove 13. Yet, the ring by being under inherent radial compressive load will exert its expanding force on the ring segments 18 and 19.

From the above description it will, therefore, be understood that this invention provides a packing ring assembly wherein sealing rings are urged radially outward and are held in separated relation by a self-expanding spring ring which does not depend upon engagement with a ring groove to exert its expanding force on the sealing rings. The self-expanding ring thus serves a dual function of an expander and a separator in a packing ring assembly. The combination expanding and separator ring is open around its periphery so as not to impede free drainage of oil in oil ring assemblies. The ring can be made continuous by welding or otherwise securing the ends together and the resulting complete annulus can be stretched over the head of the piston and snapped into the oil ring groove.

I claim as my invention:

1. A combined spacer and expansion ring for packing ring assemblies which comprises an axially corrugated spring metal ring having sloping legs connected at the tops and bottoms thereof by loops, said loops having slits parallel to the inner periphery of the ring, cuts bisecting said slits and extending to the inner periphery of the ring, said slits and cuts defining tabs connected to the inner peripheries of the legs and said tabs extending beyond the loops to form abutment shoulders at the inner peripheries of the loops, said ring adapted to be radially contracted through the resiliency of the corrugations for causing the abutment shoulders to exert a radially expanding force on rings supported by the loops.

2. A spacer and expander for supporting, spacing and outwardly pressing generally flat parted thin rails in a piston ring assembly comprising a generally circular corrugated length of flat metal ribbon stock having abutting ends and substantially parallel longitudinal edges, the corrugations extending generally axially and comprising upper and lower radially extending crowns connected alternately at their ends by axially inclined legs, and upstanding narrow tabs on the inner ends of the legs extending beyond the crowns to provide abutment shoulders for outwardly pressing the rails of the assembly, said tabs being inclined axially with the legs and the projecting ends of the tabs converging toward the central portions of the crowns to provide two abutment shoulders for each crown.

3. A piston ring assembly comprising a pair of cylinder engaging rails and a combined spacer and expander member for expanding the rails radially and for holding the rails in axially spaced relation, said member comprising a strip of sheet metal corrugated axially to provide a top series of crowns and a bottom series of crowns, the crowns of the two series alternating with respect to each other and being concentric, upright legs connecting the ends of the two series of crowns, and tabs on the inner peripheries of the legs extending axially beyond the crowns to provide abutment shoulders on each crown adapted to engage the rails supported on the crowns for expanding the rails radially while the crowns support the rails in axially spaced relation.

4. A combined spacer and expander piston ring composed of a ribbon of sheet metal having first slits inwardly from one edge at intervals and second slits parallel to said edge intersecting the first slits, said ribbon having axial and circumferential corrugations defining alternate top and bottom loops joined by inclined legs and tabs provided by the slit portions on the inner periphery of the legs extending parallel with the legs above and below the loops to form converging abutments on each loop.

References Cited in the file of this patent
UNITED STATES PATENTS
2,656,230   Phillips _____ Oct. 20, 1953